United States Patent [19]
Okado

[11] 3,965,403
[45] June 22, 1976

[54] CONSTANT POWER CONTROL OF A D.C. ELECTRIC MOTOR FOR HANDLING CARGOES

[75] Inventor: Chihiro Okado, Fuchu, Japan

[73] Assignee: Tokyo Shibaura Electric Co., Ltd., Japan

[22] Filed: Aug. 23, 1974

[21] Appl. No.: 500,086

[30] Foreign Application Priority Data
Aug. 24, 1973 Japan.............................. 48-94933
Aug. 24, 1973 Japan.............................. 48-94935

[52] U.S. Cl................................ 318/143; 318/154
[51] Int. Cl.[2]......................................... H02P 7/16
[58] Field of Search ....................... 318/141–143, 318/151–154, 432

[56] References Cited
UNITED STATES PATENTS
3,448,357  6/1969  Dolphin .......................... 318/154 X
3,735,226  5/1973  Pittner ............................ 318/432 X
3,867,678  2/1975  Stoner.............................. 318/432

Primary Examiner—Gene Z. Rubinson
Assistant Examiner—W. E. Duncanson, Jr.
Attorney, Agent, or Firm—Oblon, Fisher, Spivak, McClelland & Maier

[57] ABSTRACT

A crane motor control is disclosed which includes a variable D.C. voltage supply in a Ward-Leonard set which is controlled by a load torque signal obtained by sensing the armature current of a motor, magnetic flux in the motor field winding and the rate of change of motor speed. The torque signal controls the variable D.C. voltage supply to keep the motor armature current or the motor field current at a preset constant value upon completion of motor acceleration.

6 Claims, 10 Drawing Figures

CONSTANT POWER CONTROL OF A D.C. ELECTRIC MOTOR FOR HANDLING CARGOES

BACKGROUND OF THE INVENTION

1. Field of the Invention:

This invention relates generally to an electric control for a D.C. electric motor, and more particularly to a constant power control for a D.C. electric motor which is adapted for use with a cargo crane for raising and lowering cargo suspended therefrom.

2. Description of the Prior Art:

For the general purpose mentioned above, it is convenient to use a D.C. electric motor connected to a variable D.C. voltage supply to form a conventional Ward-Leonard type system. As is well known in the art, an electric motor presents its maximum efficiency when it operates under its rated load. Thus a constant power control is conveniently adapted to drive motors which hoist and lower cargoes. That is to say, if a constant power control is coupled to the D.C. crane motor, the latter will be able to handle a cargo with a high speed when the cargo is light, and when the cargo is heavy the motor is driven with a moderate or low speed.

In the past, such constant power controls have been achieved by using a constant armature current control with a variable excitation control of the external excitation field winding.

Such devices were somewhat satisfactory, but there remained a defect which required improvement. Let us consider the acceleration of the motor in the lifting operation when using the prior art constant power control. The motor armature current will be controlled to hold an amplitude of 100% of the rated current even if a light cargo is loaded. Accordingly the field current is also controlled so as to be increased in response to a large armature current, so that the lifting speed of the motor will be held low resulting in a low cargo handling efficiency.

Further to the above, when a relatively heavy cargo is lowered by the crane, the armature current will be relatively low during lowering acceleration because of the weight of the cargo, and as a result the field current will be controlled to hold a relatively low amplitude in response to the relatively low armature current. This causes the motor speed to increase more. Thus a positive feedback will function in the system momentarily, so that the lowering operation of the heavy cargo may be come unstable.

In addition, the hoisting and lowering operations will generally be made in a different manner with a heavy cargo. This is caused by the difference in mechanical efficiency between the hoisting and lowering operations.

SUMMARY OF THE INVENTION

It is accordingly one object of the invention to provide an improved constant power control for a D.C. electric motor, which is used for handling cargoes, and which does not involve the above defects.

Another object of the invention is to provide an improved Ward-Leonard system which is adapted to be used with a D.C. controlled cargo crane to hoist and lower cargoes efficiently.

It is a further object of the invention to provide a cargo crane control which detects the torque load of a crane motor to anticipate the motor current after completion of the load acceleration, so that the anticipated motor current is employed for controlling the present motor current during acceleration as a reference to control the motor speed.

It is a still further object of the invention to provide an improved cargo crane control which detects load torque on the crane motor to anticipate the motor field current after completion of load acceleration so that the anticipated motor field current is employed for controlling the present motor field current during acceleration as a reference to control the motor speed.

Briefly, these and other objects of the invention are achieved in accordance with one aspect of the invention, by providing a constant power control for a D.C. electric motor composed of a WardLeonard set including a variable D.C. voltage supply. A D.C. electric motor is connected to the variable D.C. voltage supply to be energized therefrom to thereby hoist and lower a load. A first means is provided for sensing load torque from the motor armature current at a time when the motor is accelerating under a constant load. Magnetic flux emanating from the motor field and the rate of change of the motor speed are also detected at the same time. A second means is provided for controlling the Ward-Leonard set to regulate the motor speed in accordance with the detected load torque. The Ward-Leonard set is thus controlled such that a selected electrical parameter of the motor is set at a predetermined amplitude decided by the motor torque.

BRIEF DESCRIPTION OF THE DRAWINGS

A more complete appreciation of the invention will be readily obtained as the same becomes better understood by reference to the following detailed description when considered in connection with the accompanying drawings, in which:

FIG. 3 is a block diagram of a logic circuit of FIG. 2a;

DETAILED DESCRIPTION OF THE PREFERRED EMBODIMENTS

Figure 1A:
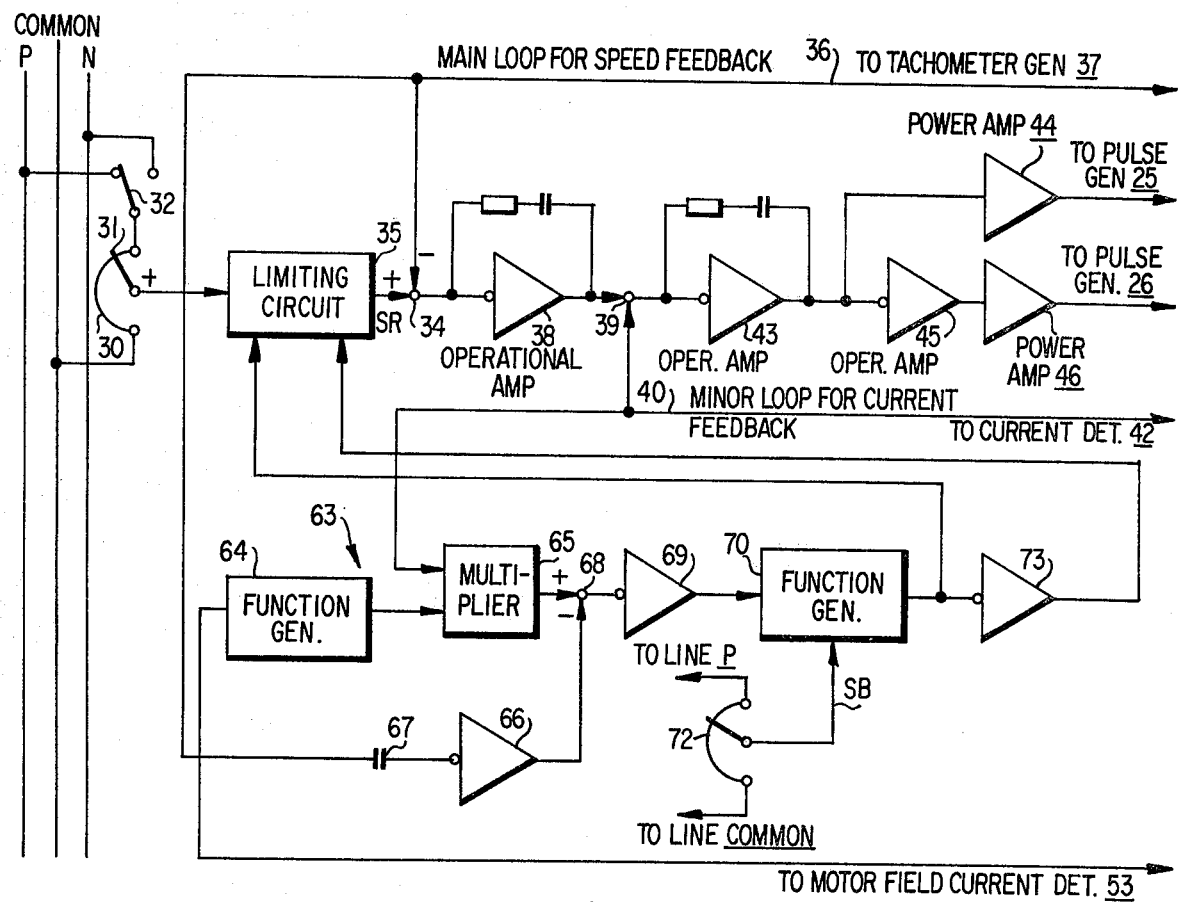
FIGS. 1a and 1b together, form a block diagram of one embodiment of a constant power control for a D.C. electric motor for hoisting cargo in accordance with this invention.
Figure 1B:
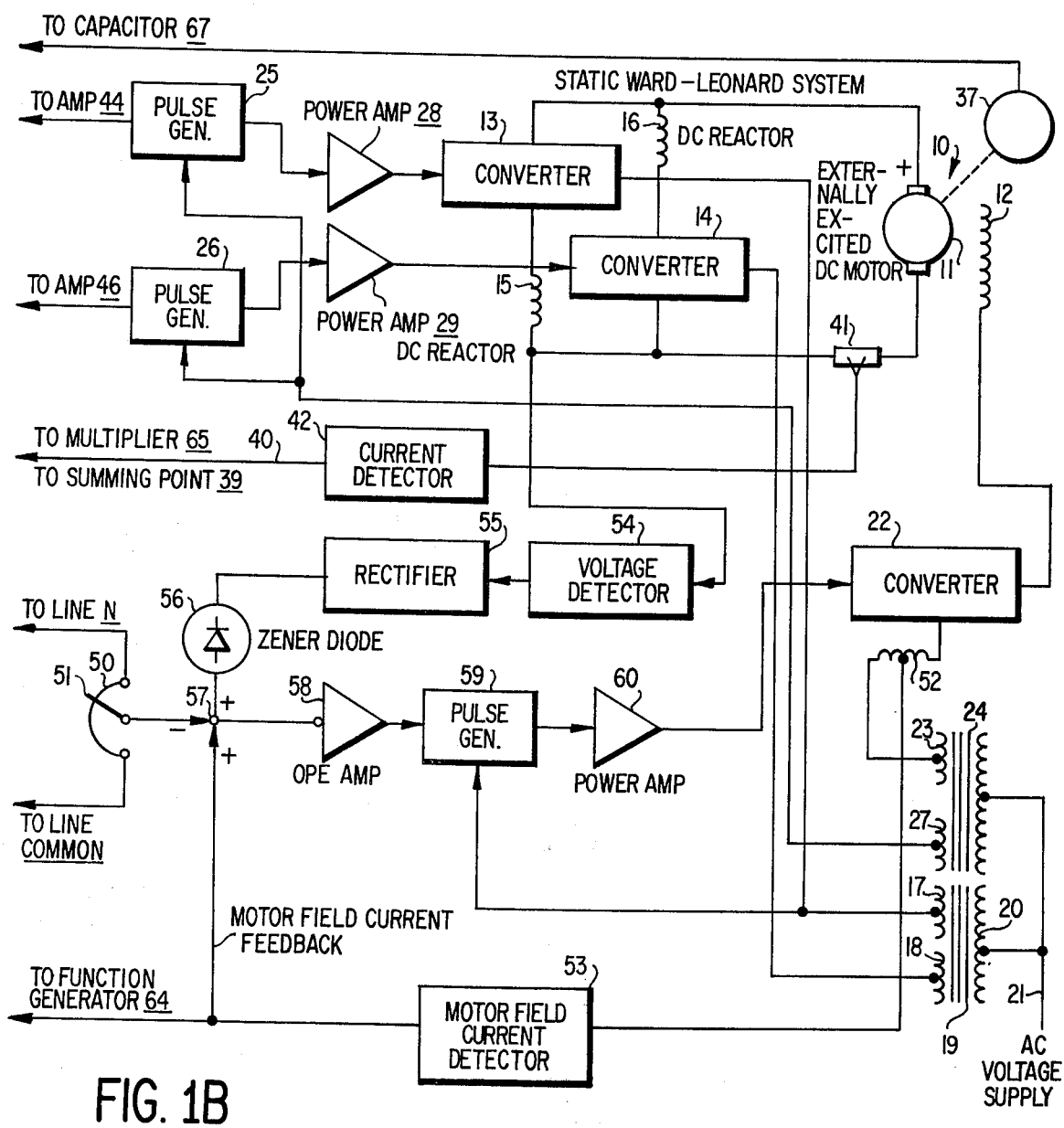

Referring now to the drawings, wherein like reference numerals designate identical or corresponding parts throughout the several views, and more particularly to FIGS. 1A and 1B, there is shown an externally excited D.C. electric motor 10 having an armature 11 and an external excitation field winding 12. The armature 11 is energized respectively from thyristor converters 13 and 14 connected in antiparallel. For avoiding a crossing current which may flow between the antiparallel connected converters 13 and 14, reactors 15 and 16 are provided respectively in series with converters 13 and 14 as shown.

Thyristor converters 13 and 14 are energized from secondary windings 17 and 18 respectively of an electric power transformer 19 with a primary winding 20 connected to an A.C. voltage supply 21.

An auxiliary thyristor converter 22 is provided for applying a variable D.C. excitation to field winding 12 upon being energized from secondary winding 23 of another power transformer 24 with a primary winding 25 connected to the A.C. voltage supply 21.

Referring again to antiparallel connected converters 13 and 14, the converter 13 is employed to apply the forward running current to armature 11, while the converter 14 is employed to apply the reverse running current to armature 11.

For applying separate gating pulses to the thyristor gate electrodes of converters 13 and 14, a pair of gating pulse generators 25 and 26 are provided and the same generate the gating signals with a repetition frequency which is the same as that of A.C. voltage supply 21 because a secondary winding 27 of transformer 24 energizes both pulse generators 25 and 26. The gating pulses emanating from pulse generators 25 and 26 are applied to the thyristor gate electrodes of converters 13 and 14 through power amplifiers 28 and 29, respectively.

For effecting phase control of pulse generators 25 and 26, a positive line P, a negative line N, and a zero voltage or "COMMON" line are coupled to a D.C. control voltage supply. A potentiometer 30 is provided for obtaining a speed reference voltage from its slider 31 and the same is connected between positive and negative lines P and N and the "COMMON" line through a single-pole-double-throw switch 32.

When the movable contact of switch 32 is thrown leftward for starting the motor 10 in a forward direction, a forward running reference voltage with a positive polarity is obtained from the slider 31. If the potentiometer slider 31, is gradually rotated clockwise from a minimum voltage position to a maximum voltage position, a variable reference voltage which increases from a minimum toward a maximum is obtained from the slider 31. Thus the potentiometer 30 may also be described as a master speed controller.

The speed reference voltage is applied to a summing point 34 through a limiting circuit 35 which will be described in detail hereinbelow. A first minor loop 36 is provided for feeding the speed responsive signal back from a tachometer generator 37 which is connected to the rotating shaft of motor 10 and the summing point 34. Both signals respectively have their polarity as shown, and the difference or error signal is applied to an operational amplifier 38 which puts out a current reference voltage which is applied to a summing point 39.

A second minor loop 40 is provided to feed a motor current signal back to the summing point 39 through a shunt 41 connected in the motor armature circuit and a current detector 42, which is preferably a conventional direct current transformer which provides a high degree of isolation between the motor circuit and the control circuit. The current error signal coming from the summing point 39 goes into a second operational amplifier 43 to be processed therein. The processed current error signal follows two paths one of which is from a power amplifier 44 to pulse generator 25 and other of which is from an operational amplifier 45 through a power amplifier 46 to pulse generator 26. The operational amplifier 45 is used for polarity reversal of the output signal coming from the operational amplifier 43.

As described above, the circuit is set to effect forward rotation of the motor 10, so that the polarity of the speed reference voltage appearing on slider 31 of potentiometer 30 is positive. In this way, the current control signal is positive, so that power amplifier 44 causes the pulse generator 25 to generate gating pulses, the phase of which advances gradually in accordance with the movement of potentiometer slider 31. On the other hand, the operational amplifier 45 similarly outputs negative current control signals, so that power amplifier 45 causes pulse generator 26 to generate gating pulses, the lag angle of which is selected so as to fall within the inverter zone.

In this way, the converter 13 can operate as a rectifier to energize the armature 11 so as to run it forward, and alternately the converter 14 may act as an inverter to avoid the current circulation therethrough from converter 13 and motor armature 11.

From the above, it will be clearly understood that the motor 10 starts its forward operation to hoist a cargo (not shown) and increases its rotational speed gradually in accordance with the movement of potentiometer slider 31 energizing the armature 11 only from converter 13. It is further understood that the motor speed is controlled by the reference signal from slider 31 and the speed feedback signal from the tachometer generator 37 is held at a value defined by the position of slider 31 of the potentiometer or master controller 30, and that the motor current is controlled by the current reference coming from the operational amplifier 38 and the current feedback signal coming from the current detector 40 is held at an amplitude defined by the output signal level of the operational amplifier 38.

Alternately if the switch 32 is thrown rightward to start the motor 10 rotating in reverse to lower the cargo, a negative speed reference signal voltage appears on the potentiometer slider 31. Accordingly the polarity of the current reference signal appearing on the output of operational amplifier 38 causes the operational amplifier 43 to generate gate control signals with a negative polarity. In this event the operational amplifier 45 provides a positive output, so that pulse generator 26 generates gating pulses which gradually advance the phase in accordance with the clockwise movement of slider 31 of potentiometer 30. Accordingly, the converter 14 is now able to energize the motor armature 11 in reverse, so that the motor is in turn able to rotate in reverse to lower the cargo. It is understood in this event that the converter 13 alternately remains as an inverter to avoid the current circulation therethrough from converter 13 and motor armature 11, because the phase of gating pulses emanating from pulse generator 25 lags greatly the output of power amplifier 44 as mentioned above.

In order to effect the excitation control of the motor 10, a potentiometer 50 connected between lines N and "COMMON" of auxiliary D.C. voltage supply and having a slider 51 is provided for presenting a negative field current current reference on the slider 51. An actual field current is also obtained from a current transformer 52 provided at the A.C. input terminals of converter 22 through a motor field current detector 53 which runctions as an electric isolation device between the A.C. input lines of converter 22 and the low voltage D.C. control circuit. In addition, the D.C. output voltage of converters 13 and 14 is derived from the motor armature circuit through a D.C. voltage detector 54, a rectifier 55 and a Zener diode 56. The voltage detector 54 may be formed a device similar to a D.C. current transformer which outputs an A.C. current proportional to a D.C. current to be measured.

These three electrical quantities are connected to a summing point 57 such that the reference from potentiometer 50 is negative, and the D.C. voltage from voltage detector 54 and the motor field current from current detector 53 are both positive. The arithmetic sum of these quantities is generated in an operational amplifier 58 which outputs a phase control signal to a pulse generator 59 to adjust the angle of lag thereof. The pulse emanating from pulse generator 59 go through a power amplifier 60 to the thyristor gate electrodes of converter 22 to effect the phase control thereof to thereby adjust the field excitation current.

The polarity of the field current of the field reference is so negative that the one of the output signals of the operational amplifier 58 becomes positive, and accordingly the field reference causes pulse generator 59 to advance the gate control angle of converter 22 until the field current equals that defined by the absolute value of the reference. In this way, the field current control is such that the feedback quantity of field current becomes substantially equal to that of the field current reference.

From the above, it is clearly understood that a forced excitation is made in accordance with the position of slider 51 during the first step of motor acceleration independently of either forward or reverse running of the motor 10. However, as the motor speed increases the motor armature or converter output voltage also increases. If the motor armature voltage reaches a predetermined level to overcome the voltage of Zener diode 56, the latter becomes conductive to apply the motor armature voltage to the summing point 57 in the positive polarity. Accordingly the pulse generator 59 is controlled so as to compress the gate control angle of the converter 22 thereby to bring about weak field control of the motor field 12 automatically. In this way the motor 10 is able to increase its speed automatically in accordance with the degree of conduction of Zener diode 56 which in turn responds to the degree of elevation of the motor armature circuit voltage.

The load torque is generally able to be obtained from the following equation:

$$T = K_1 \phi I \quad (1)$$

wherein
T . . . torque
$\phi$ . . . magnetic flux of motor field
I . . . armature current
$K_1$ . . . constant As is well known in the electric crane motor control art, the load torque of the crane motor is constant because the weight of the load or cargo does not vary during its suspension from the crane.

In the case of a constant torque load which balances under an armature current of $I_B$ when the maximum magnetic flux is $\phi_o$, an armature current which balances when the flux $\phi$ is shown by:

$$I_B \frac{\phi_o}{\phi} \quad (2)$$

The armature current existing during the motor acceleration is shown by:

$$I - I_B \frac{\phi_o}{\phi} \quad (3)$$

so that the equation of acceleration is:

$$\phi (I - I_B \frac{\phi_o}{\phi}) = K \frac{dw}{dt} \quad (4)$$

Equation (4) can be varied as follows:

$$I_B \cdot \frac{\phi_o}{\phi} = I - \frac{K \frac{dw}{dt}}{\phi} \quad (5),$$

and then $$I_B \cdot \phi_o = \phi I - K \frac{dw}{dt} \quad (6).$$

Further in the usual case in which an armature current takes a general amplitude of $$I_R = I_B \frac{\phi_o}{\phi},$$

the motor speed $S_R$ at that time is represented by:

$$S_R = S_B \cdot \frac{I_R}{I_B}$$

$$S = \frac{\overline{V} - IR_a}{\phi}. \quad (7)$$

Wherein V is the armature terminal voltage, and $I R_a$ is the armature voltage drop. When the motor armature current is kept constant, "$V - I R_a$" is constant, namely:

$$\overline{V} - I R_a = K_2.$$

On the other hand, the motor speed S is represented by:

$$S = \frac{K_2}{\phi},$$

so that a following equation is introduced:

$$\frac{1}{\phi} = \frac{I_R}{I_B} \cdot \frac{1}{\phi_o}$$

In this way, the following equation can be obtained from equations (6) and (7).

$$S_R = S_B \frac{I_R \cdot \phi_o}{\phi I - K \frac{dw}{dt}} = \frac{S_B K_3}{\phi I - K \frac{dw}{dt}}$$

$$= \frac{K_4}{\phi I - K \frac{dw}{dt}} \quad (8)$$

As a result, it is understood that if the motor speed is determined by equation (8), the motor current will be able to balance at an amplitude of $I_R$. It is further understood that ($\phi I - K dw/dt$) of equation (6) becomes constant, namely:

$$\phi I - K\, dw/dt = K_5 \ldots \quad (9)$$

so long as there is no vibration of the load.

In accordance with the above comments, there is provided an additional control circuit generally designated by the reference numeral 63 for detection of the acceleration load torque. The circuit 63 includes a function generator 64 to which is applied the field current from the motor field current detector 53, and which outputs a signal in response to magnetic flux $\phi$. A multiplier 65 is provided to multiply the magnetic flux $\phi$ and the motor armature current I coming through the minor loop 40 for armature current feedback. An operational amplifier 66 is further provided for effecting an acceleration of the motor 10 (dw/dt), based on an electric signal which comes from the minor loop 36 for speed feedback through a differential capacitor 67.

The resulting signals obtained from multiplier 65 and operational amplifier 66 are applied to a summing point 68 in opposite polarities as shown, and the same are applied to an operational amplifier 69 to produce a load torque signal. The output signal from the operational amplifier 69 is then applied to a function generator 70 which in turn receives another signal $I_B$ which is the armature current when the maximum field flux $\phi_o$ is present, as described above. As the amplitude of $I_B$ may be constant, it can be obtained from a potentiometer 72 connected between lines P and "COMMON" of the auxiliary D.C. control voltage supply.

In this way, the actual load torque, $\phi I - K\, dw/dt$, has been obtained by being considered the magnetic flux $\phi_B$ as described above, and the same is output from function generator 70. The output signal from function generator 70 is applied to the limiting circuit 35 in a positive polarity and to an operational amplifier 73 which functions as a polarity change amplifier for applying its output signal in a negative polarity to the limiting circuit 35.

The positive output signal from the function generator 70 is fed to the limiting circuit 35 with the speed reference coming from potentiometer 30 and having the positive polarity for running the motor 10 forward, so that the speed reference is modified so as to thereby produce a motor armature current which is constant. Similarly in the reverse running of the motor 10, the negative output signal from operational amplifier 73 is processed in the limiting circuit 35 with the speed reference from potentiometer 30 having a negative polarity, so that the speed reference is modified to produce a motor armature current which is constant. The speed reference processed in the limiting circuit 35 is suitably limited if desired to finally present an amplitude of $S_R$ in response to the load torque as described in equation (8).

From the above, in accordance with this embodiment of the invention, it can be understood that the motor armature current is controlled by the speed reference $S_R$ modified by the actual load torque during the motor acceleration, anticipating the final constant armature current which usually has an amplitude of 100% of the rated current. This causes the crane motor to run with a higher speed than prior art devices under a light load during the acceleration thereof, so that the cargo handling efficiency can be greatly elevated. In addition, the positive feedback, which may occur to positively feed a relatively low armature current back to a field current adjuster to further increase the field current thereby to undesirably further decrease the motor speed during the lowering operation of a relatively heavy cargo and which is described above, does not occur in the control of the described embodiment because the control is always made by considering the actual load torque. It can further be understood that the motor speed difference between the hoisting and lowering operations, due to the mechanical efficiency of the parts, which is also described above, does not occur in the disclosed embodiment.

Figure 2A:
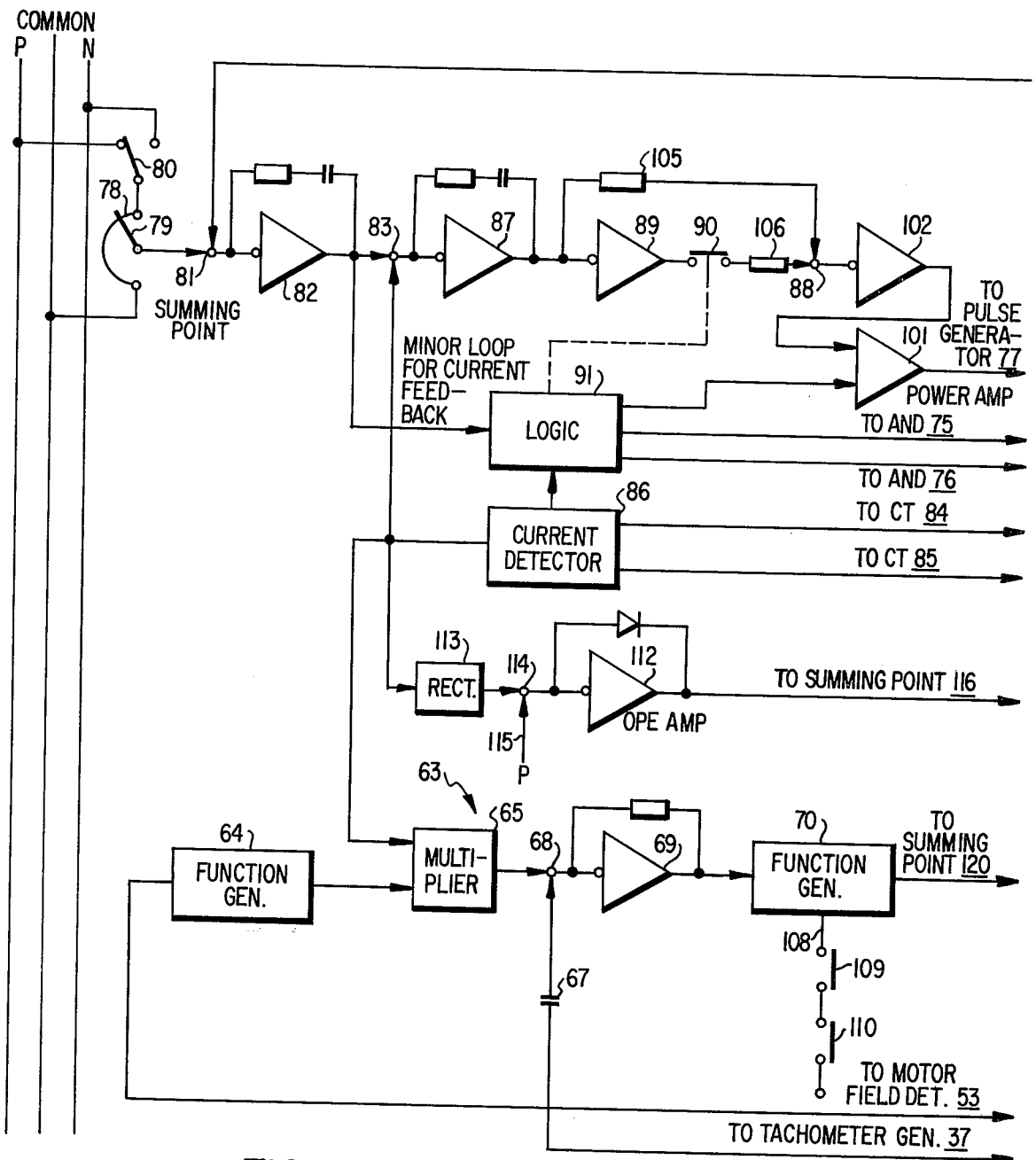
FIGS. 2a and 2b together form a block diagram of another embodiment of a constant power control for a D.C. motor in accordance with the invention.
Figure 2B:
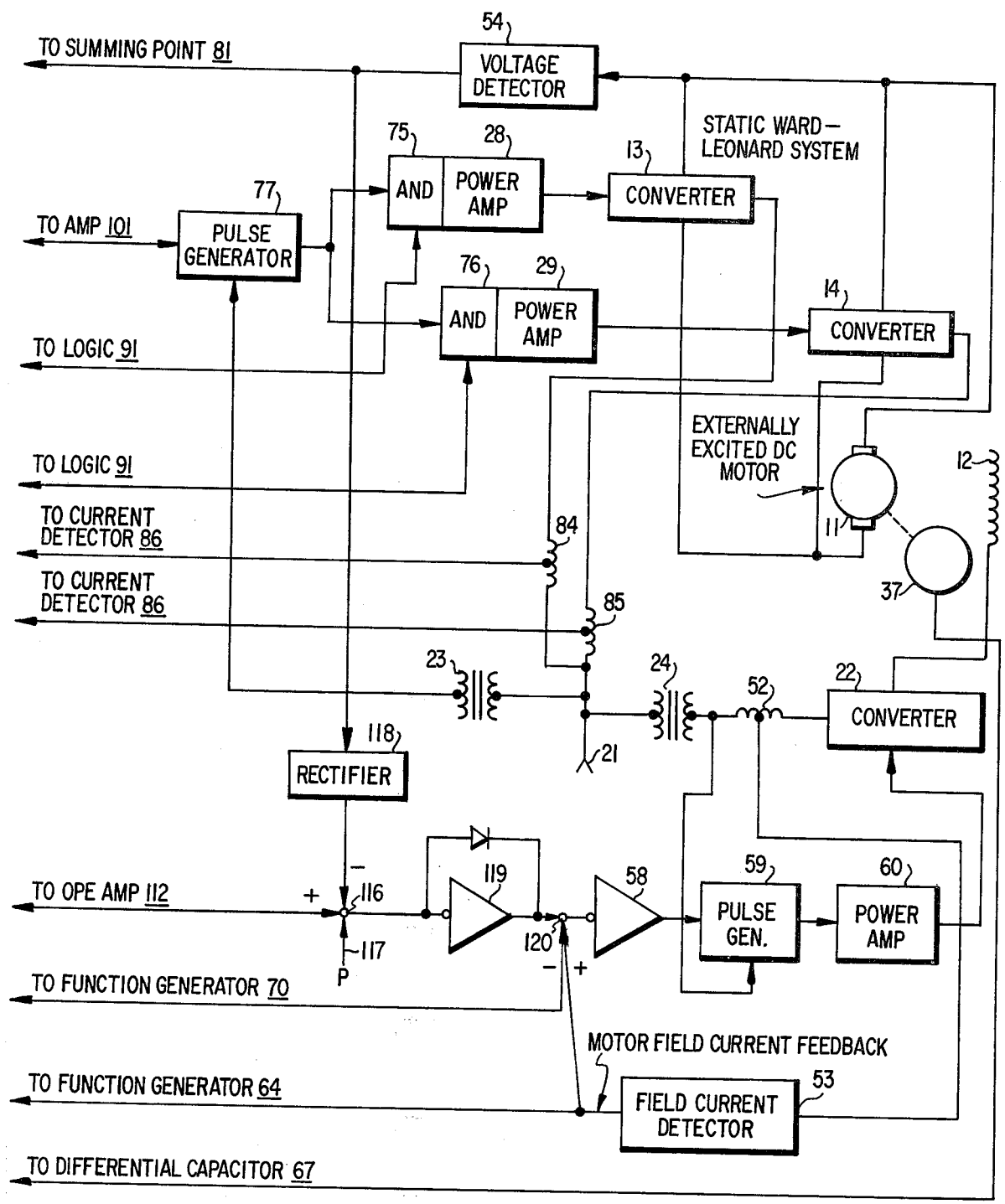

FIG. 2 shows another embodiment of this invention, wherein similar or identical parts to those of FIG. 1 are designated by the same reference numerals and are not further described in detail. In accordance with this embodiment, power amplifiers 28 and 29 respectively have AND gates 75 and 76 for forwarding of the gating pulses selectively to converters 13 and 14. A pulse generator 77 is provided in common to both converters 13 and 14. The gating pulses are applied selectively to converters due to the alternate ON - OFF operations of AND gates 75 and 76. A master controller or potentiometer 78 is used for effecting control of the armature voltage of the motor 10 to, in turn, control the speed thereof, and the same is connected between lines P and N and "COMMON" lines through a single-pole-double-throw switch 80 for selection of forward and reverse running of the motor 10.

The voltage reference from a slider 79 of potentiometer 78 is connected to a summing point 81 to which a voltage feedback signal is applied from the D.C. circuit of converters 13 and 14 through a voltage detector 54. The voltage difference from the summing point 81 is processed in an operational amplifier 82 to generate a current reference therefrom. The output signal from amplifier 82 to connected to a summing point 83 at which the same is compared with a motor current feedback signal from either one of current transformers 84 and 85 provided in the A.C. circuits of converters 13 and 14, respectively, through a current detector 86. The difference current signal from summing point 83 is processed in an operational amplifier 87.

The current control signal from operational amplifier 87 takes two paths, one of which is connected directly to a summing point 88 and the other of which is connected to the summing point 88 through an operational amplifier 89 for reversing the polarity of the output signal of the operational amplifier 87 and to a switch contact 90 of a logic circuit 91. The contact 90 is shown as a mechanical type, although it can be an electronic device such as a transistor switch to be switched on and off by the output signal from the logic circuit 91.

Figure 3:
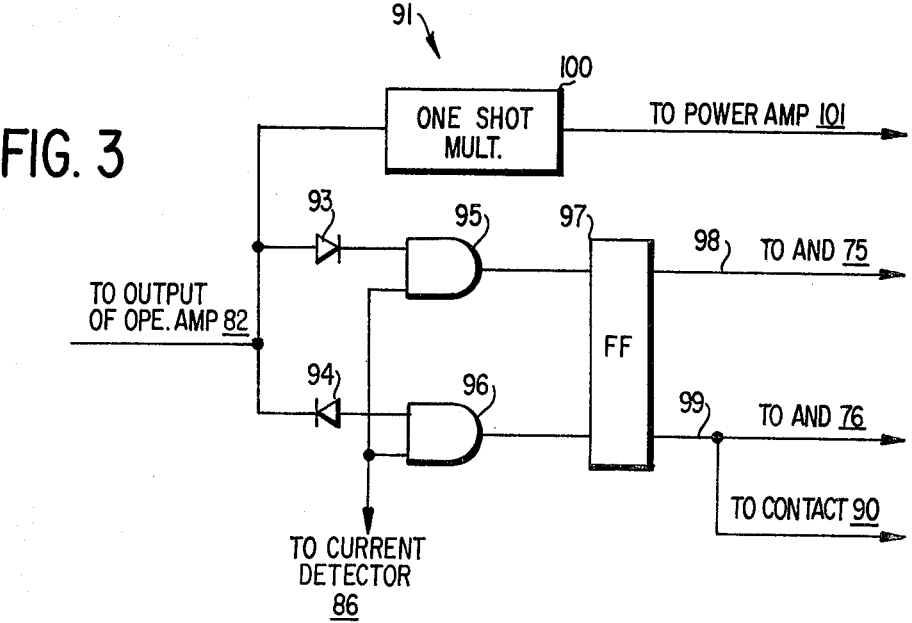

The logic 91 may be a circuit as shown in FIG. 3, and the same includes an input connected to the output of operational amplifier 82, a pair of diodes 93 and 94 for selection of polarities of the output signals of the amplifier, OR gates 95 and 96 respectively having one input selectively connected to diodes 95 and 96 and other inputs connected to current detector 86, a flip-flop circuit 97 having a set terminal connected to diode 95 and a reset terminal connected to diode 96 and a pair of output terminals 98 and 99. A one-shot-multivibrator 100 is also connected between the operational amplifier 82 and one input terminal of a power amplifier 101.

For the motor 10 to rotate forward, the forward signal comes from operational amplifier 82 which is able to go through diode 93 to the set terminal of flip-flop 97 to output a signal therefrom to AND gate 75 to make it open. Another input signal is applied to the other input terminal of power amplifier 101, which comes from the summing point 88 through an operational amplifier 102 and which functions as the phase control signal for the pulse generator 77. However, the output from one-shot multivibrator 100 can overide for a while the phase control signal from operational amplifier 102, so that the output of power amplifier 101 causes the pulse generator 77 to compress the gate control angle of converter 13 so as not to allow a D.C. voltage therefrom. Accordingly the motor armature 11 is not energized for awhile at the beginning of forward running until the control signal is sufficiently established.

As soon as the output from one-shot multivibrator 100 has ended, the power amplifier 100 outputs its signal to enable the converter 13 to generate a D.C. voltage in response to the control signal from operational amplifier 102. In this way, the motor 10 can start its forward rotation, and at that time the current detector 86 detects the presence of the input current of converter 13, so that OR gate 95 continues to produce its output signal through the output of current detector 86 to thereby maintain the set state of flip-flop 97 to hold the AND gate 75 open.

The start of the reverse rotation of the motor 10 can be easily produced by throwing the switch 80 rightward. In this way, flip-flop 97 of logic 91 is reset to generate its output signal at terminal 99 to thereby open the AND gate and close the contact 90. Thus the power amplifier 101 cannot generate its output signal for awhile until the switching from forward to reverse running is completed.

When contact 90 closes, the output signal from operational amplifier 87 goes to the summing point 88 together with the output from operational amplifier 89. If a resistor 105 connected in series with operational amplifier 87 has its resistance value set at twice that of resistor 106 connected in series with operational amplifier 89, and if the amplifiers 87 and 89 have the same gain, then the output signal from summing point 88 has an amplitude which is the same as that of the amplifier 87 but which has the reverse polarity. However as the reverse direction has been selected by the switch 80, the polarity of output signal of summing point 88 does not change, so that the power amplifier 101 can operate as it is to effect appropriate gate control of converter 14.

In accordance with this embodiment of the invention, the external excitation current of the field 12, namely the magnetic flux $\phi$ is controlled by the circuit 63 for detecting the load torque in accordance with the equation (8) described above. The form of circuit 63 for producing a load torque signal is substantially similar to that of FIGS. 1A and 1B except that the motor armature current applied to the multiplier 65 is taken from current detector 86 and except for the starting device for the function generator 70.

The function generator 70 has another input terminal 108 having normally open contacts 109 and 110 connected in series. The contact 109 closes when the D.C. voltage is established in the motor armature circuit, so that the same may be a contact of a relay connected to the output terminal of D.C. voltage detector 54. Accordingly the function generator 70 can operate first when the D.C. voltage is established across the motor armature 11, so that hunting or distortion cannot occur in the control circuit at the initiation of the control in question. The contact 110 is an auxiliary contact of the master controller or potentiometer 78, and the same can close when the master controller 78 is operated to effect forward and reverse rotation of the motor 10.

In this way, the load torque signal producing circuit 63 can supply the output signal from the function generator 70 as described in FIGS. 1A and 1B. The contact 110 is provided in order to apply the weak field control to the converter 22 for controlling the field current. It can be understood that the weak field control is preferably made after acceleration of the motor 10 has substantially terminated.

Meanwhile, in order to limit the armature current properly, an operational amplifier 112 is supplied with an input terminal thereof connected to the output terminal of the armature current detector 86 through a summing point 114 and having a rectifier 113 connected in series. The rectifier 113 is used for obtaining a current signal which does not alternate in polarity even if the polarity of the output signal from the current detector 86 alternates through selection of either forward or reverse running of the motor 10. A suitable bias signal, which comes from lines P and "COMMON" through a conductor 115, is applied to the summing point 114 together with the output of the rectifier 113.

The output signal from operational amplifier 112 is then applied to a summing point 116 with a positive polarity. The summing point 116 receives a bias voltage through a conductor 117 from lines P and "COMMON", and further receives a voltage signal in response to the motor armature voltage from voltage detector 54 through a rectifier 118 in a negative polarity. The current and voltage signal coming from operational amplifier 112 and rectifier 118 are then processed in an operational amplifier 119 and applied to a summing point 120.

The processed load torque signal from circuit 63 is applied to the summing point 120 as a field current reference, and the same is negative relative to the field current feedback signal from the field current detector 53. In this way, the magnetic field flux $\phi$ is made proportional to the load torque signal processed in the circuit 63. It can be seen that the field current is generated based on the load torque of the crane to thereby make the armature current attain a target amplitude after finishing the acceleration in accordance with equation (8), as described above. The other effects are the same as those of FIGS. 1A and 1B.

The motor armature current signal from the operational amplifier 112 is positive at the summing point 116 and the motor armature voltage signal from the rectifier 118 is negative at the same point. Accordingly, the armature current signal adds to the field current reference, and the armature voltage signal subtracts from the field current reference. Accordingly when the armature current increases, the field current increases to increase the back e.m.f. to suitably limit the level of the same, and vice versa. When the voltage increases, the field current decreases to reduce the back e.m.f. to thereby suitably limit the level of the same, and vice versa.

Figure 4:
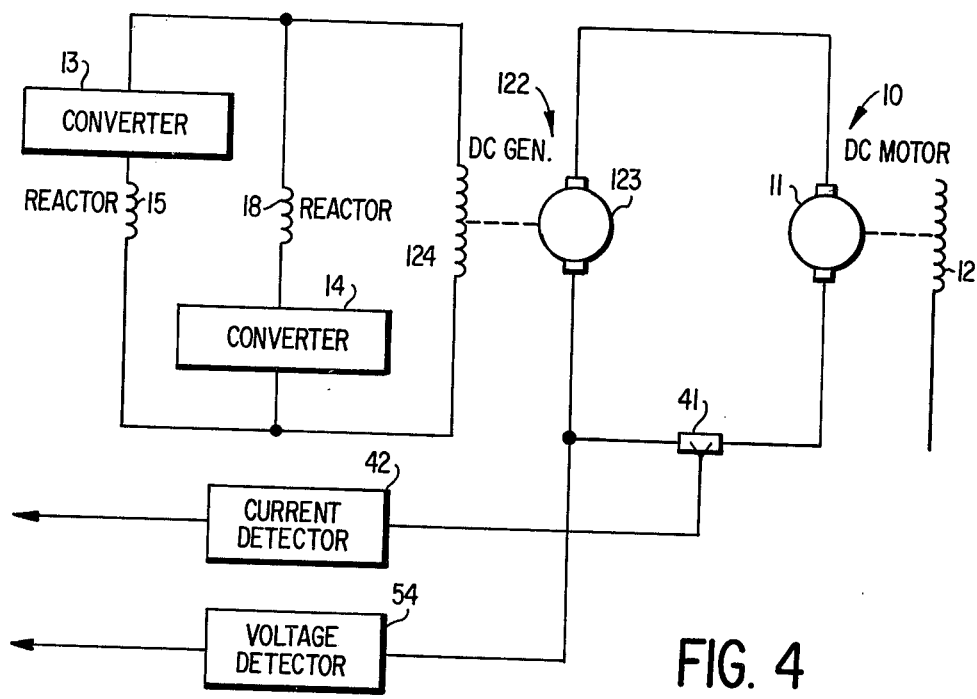
FIG. 4 is a partial block diagram of a constant power control using a Ward-Leonard motor-generator set.

FIG. 4 shows another Ward-Leonard system which includes a D.C. generator 122 which operates a variable D.C. voltage supply for the motor 10 and which further includes an armature 123 connected to the armature 11 of the motor 10 and an external excitation field winding 124 which is in turn excited from a set of antiparallel connected thyristor converters 13 and 14 similar to that of FIG. 1A.

Figure 5:
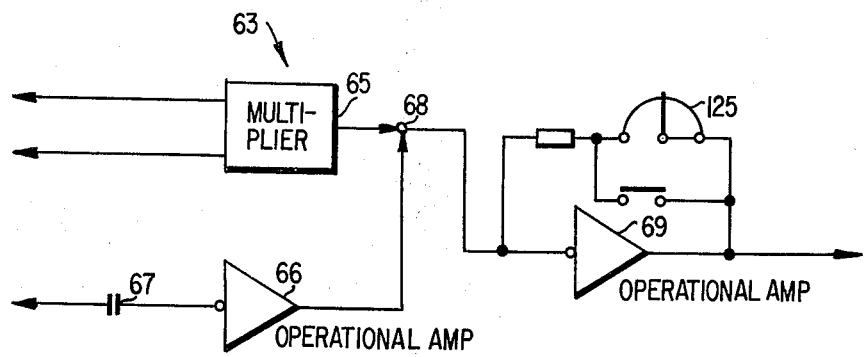
FIG 5, FIG. 6 and FIG. 7 illustrate several different torque sensing circuits, respectively; and, FIG. 8 is a partial block diagram of a speed detection circuit not requiring a tachometer generator.

FIG. 5 shows another modification of the load torque operation circuit 63 of FIG. 1A, which includes a variable resistor 125 connected in parallel between the input and output terminals of operational amplifier 69 to thereby permit adjustment of the load torque upon hoisting and lowering a cargo. Thus the characteristic of hoisting and lowering a cargo can be modified freely as desired.

Figure 6:
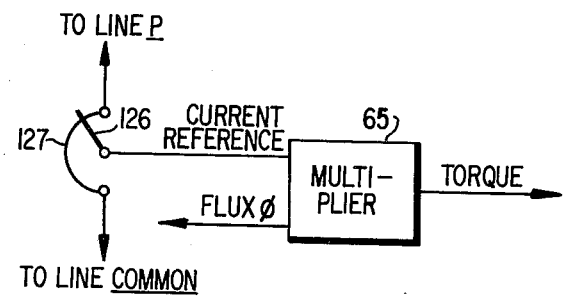

FIG. 6 shows the multiplier 65 of FIGS. 1A or 2A in which one input terminal for receiving the armature current feedback signal is connected to a slider 126 of a potentiometere 127 connected between the lines P and "COMMON". In this case, the potentiometer 127 supplies a current reference to one input terminal of multiplier 65, and the current reference is of the final target of the armature after the acceleration of the motor.

Figure 7:
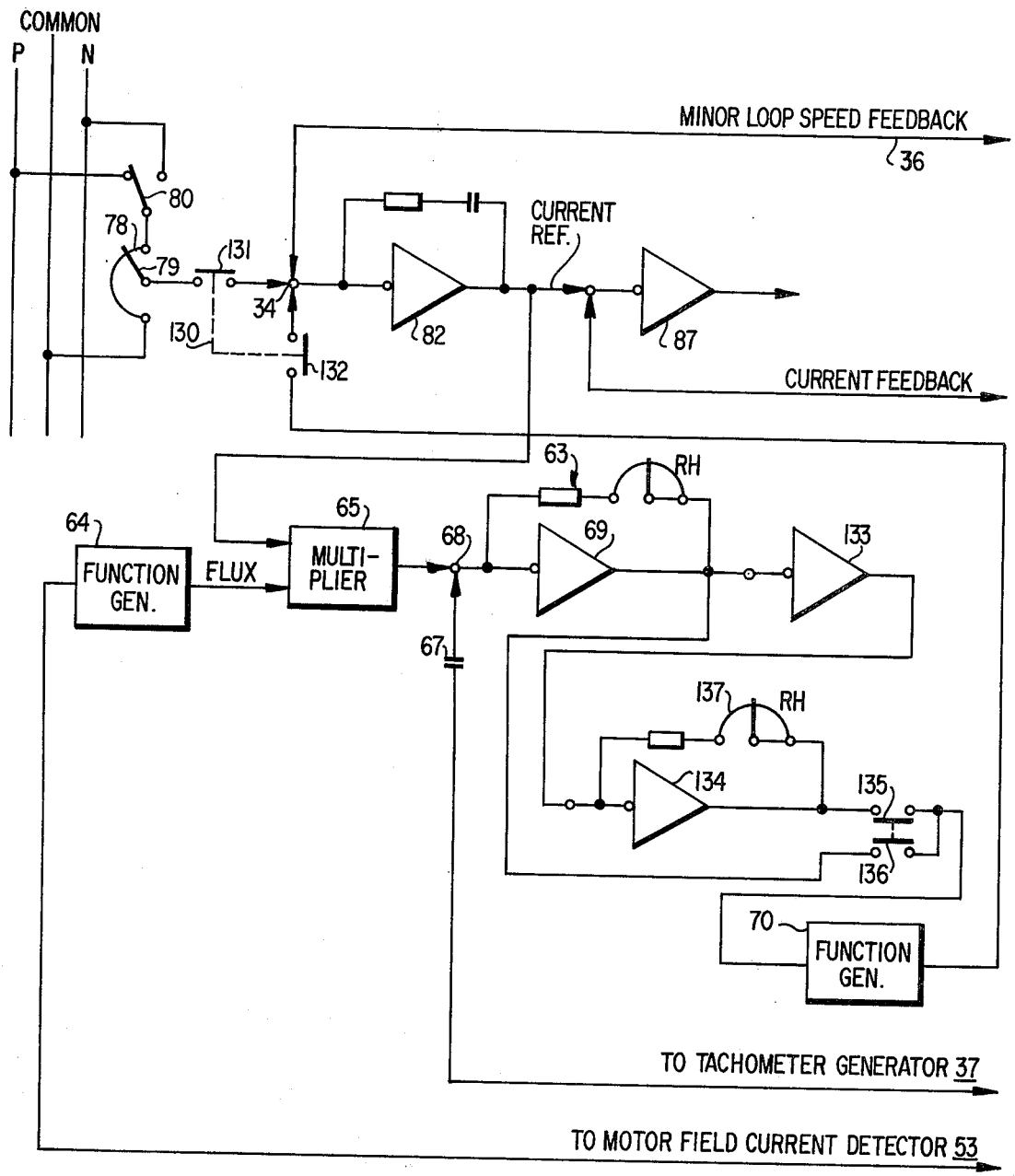

FIG. 7 shows a modification of FIG. 1A including a speed relay 130 with a normally closed contact 131 and a normally open contact 132. During low speed operation of the crane motor, the contact 131 is closed and the contact 132 is opened. Accordingly, the speed reference from potentiometer 78 is operated with the speed feedback signal coming from the minor loop 36 in the operational amplifier 82 during a predetermined low speed running of the motor upon the acceleration of the same, while the speed reference is altered by the load torque coming from the function generator 70 by switching contact 131 off and switching contact 132 on when the motor speed rises to be a predetermined high level during the acceleration of the crane motor.

In addition, a pair of operational amplifiers 133 and 134 connected in series are provided between the operational amplifier 69 and the function generator 70 through a contact 135 which closes when lowering a cargo has been selected. Alternately the ouput terminal of operational amplifier 69 is connected directly to the input terminal of function generator 70 through a contact 136 which closes when hoisting a cargo has been selected.

It can be seen that a variable resistor 137 connected in parallel with operational amplifier 134 permits the characteristics of hoisting a cargo to be adjusted freely, for example, to align the same with the lowering characteristics.

Figure 8:
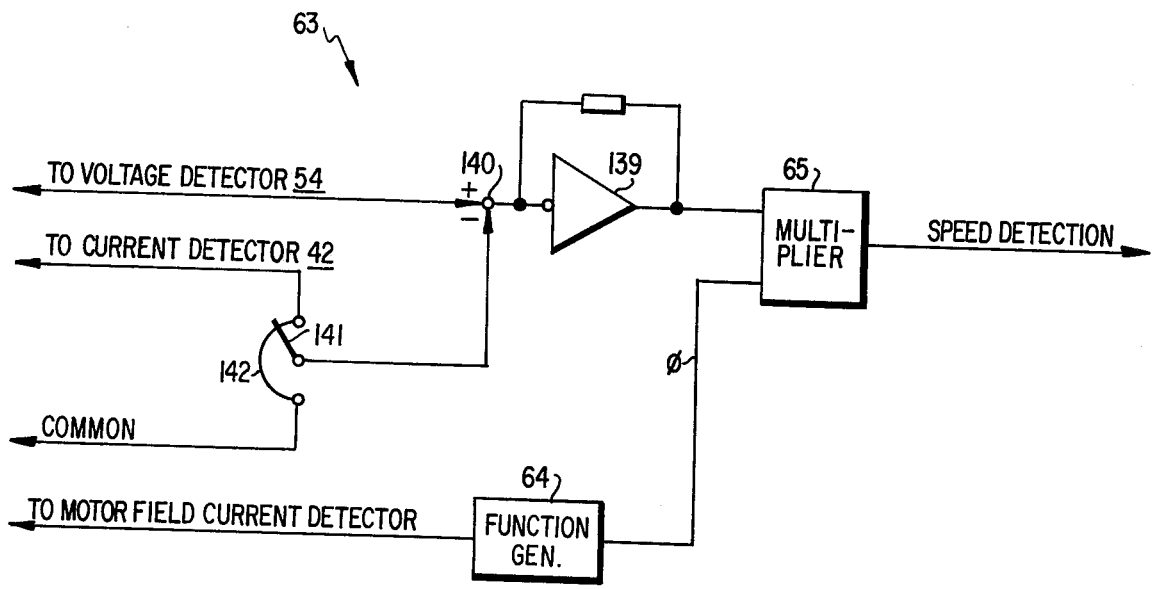

FIG. 8 shows a further modification of the load torque operation circuit 63 shown in FIGS. 1A and 1B, in which a tachometer generator 37 is not used for detection of the motor speed. In this case, an operational amplifier 139 with a summing point 140 in front thereof is provided, so that the armature voltage is applied from the voltage detector 54 to the summing point 140. The motor armature current signal is also applied to the point 140 from a slider 141 of a potentiometer 142 connected between the output terminal of armature current detector 42 and the "COMMON" line. In this way, the signal in response to "$V - IR_a$" can be processed in the operational amplifier 139, so that the speed signal $$S = \frac{V - IR_a}{\Phi},$$

can be generated through the multiplier 65 to achieve the same object as in the embodiments described above.

Obviously, numerous additional modifications and variations of the present invention are possible in light of the above teachings. It is therefore to be understood that within the scope of the appended claims, the invention may be practiced otherwise than as specifically described herein.

What is claimed and new and desired to be secured by Letters Patent of the United States:

1. A constant power control for a D.C. electric motor comprising a Ward-Leonard set including a variable D.C. voltage supply and a D.C. motor connected thereto comprising:
    means for sensing the armature current of the motor,
    means for sensing the magnetic flux in the motor field winding,
    means for sensing the rate of change of motor speed,
    means for generating a load torque signal in accordance with the armature current of the motor, a magnetic flux in the motor field winding and the rate of change of motor speed,
    means connecting the load torque signal to the variable D.C. voltage supply to control the variable D.C. voltage supply to maintain the motor armature current or the motor field current at a preset constant value upon completion of motor acceleration.

2. A constant power control for a D.C. electric motor comprising a Ward-Leonard set including a variable D.C. voltage supply and a D.C. motor connected thereto comprising:
    means for sensing the armature current of the motor,
    means for sensing the speed of the motor,
    a first function generator coupled to the motor for sensing the field excitation current of the motor for producing a first signal representative of the magnetic flux generated by the field excitation current,
    multiplier means coupled to the means for sensing the armature current of the motor and to the function generator for multiplying the first signal and the armature current of the motor,
    a first operational amplifier for producing a signal representative of the change of speed of the motor,
    a second operational amplifier coupled to the multiplier and to the first operational amplifier for producing a load torque signal in response to the outputs thereof,
    second means for controlling the Ward-Leonard set and thereby the operation of the motor in response to the load torque signal.

3. A constant power control as in claim 2, further comprising:
    a second function generator for combining said load torque signal with an acceleration target speed signal whereby the original speed reference of said motor is modified.

4. A constant power control as in claim 3, further comprising:
    a third operational amplifier coupled to said second function generator for providing positive and negative speed control signals to permit reversible operation of said motor.

5. A constant power control as in claim 3, further comprising:
    third means coupled to said second function generator for starting said second function generator upon receipt of appropriate control signals.

6. A constant power control as in claim 2, further comprising:
    a control circuit for said Ward-Leonard set for maintaining the output thereof at a low level while the motor control signals are generated.

* * * * *